(12) United States Patent
Narayanaswamy (10) Patent No.: US 7,603,376 B1
(45) Date of Patent: Oct. 13, 2009

(54) FILE AND FOLDER SCANNING METHOD AND APPARATUS

(75) Inventor: Arun Narayanaswamy, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 462 days.

(21) Appl. No.: 11/233,261

(22) Filed: Sep. 22, 2005

(51) Int. Cl.
*G06F 17/30* (2006.01)

(52) U.S. Cl. .............................. 707/102; 707/10; 707/9; 707/204; 707/101; 709/224; 711/1; 711/100; 711/200; 711/173; 345/173; 726/22

(58) Field of Classification Search .................. 707/10, 707/9, 204, 102, 101; 711/1, 100, 200, 173; 709/224; 345/173; 726/22
See application file for complete search history.

(56) References Cited

U.S. PATENT DOCUMENTS

| | | | | |
|---|---|---|---|---|
| 5,842,214 A | * | 11/1998 | Whitney et al. ............... | 707/10 |
| 6,014,675 A | * | 1/2000 | Brewer et al. ............... | 707/204 |
| 6,189,001 B1 | * | 2/2001 | McGovern et al. ............. | 707/1 |
| 6,205,527 B1 | * | 3/2001 | Goshey et al. .............. | 711/162 |
| 6,327,579 B1 | * | 12/2001 | Crawford .................... | 705/400 |
| 6,332,146 B1 | * | 12/2001 | Jebens et al. ............. | 707/104.1 |
| 6,388,687 B1 | * | 5/2002 | Brackett et al. ............. | 715/810 |
| 2004/0088331 A1 | * | 5/2004 | Therrien et al. ............. | 707/200 |
| 2006/0195904 A1 | * | 8/2006 | Williams ..................... | 726/24 |
| 2006/0236069 A1 | * | 10/2006 | Kalach et al. ............... | 711/173 |
| 2007/0130166 A1 | * | 6/2007 | Takahashi .................... | 707/10 |

* cited by examiner

*Primary Examiner*—Hosain T Alam
*Assistant Examiner*—Syling Yen
(74) *Attorney, Agent, or Firm*—Chapin IP Law, LLC; Barry W. Chapin, Esq.

(57) ABSTRACT

A method, apparatus and computer program product for file and folder scanning is presented. A host agent uses a scanning policy from a server, and scans the storage for the host system in accordance with the scanning policy. The host system then builds a data summary from the scanning results. The data summary is then provided to the server where it can be used to modify the storage on the host.

16 Claims, 6 Drawing Sheets

FILE AND FOLDER SCANNING METHOD AND APPARATUS

BACKGROUND

Companies are generating and storing ever-increasing amounts of information. Companies are requiring higher levels of availability and performance to support trends such as e-business and globalization. As networked storage infrastructures become more complex, and storage devices grow in number and size, companies are faced with the challenge of effectively managing their storage. Companies need to improve storage asset utilization by identifying and reclaiming underutilized storage.

There are many things organizations need to know about their infrastructure. Among these are how well are their assets being utilized, could they be used more efficiently, how much valuable storage is consumed by non-business or stale data and the like. Today, most organizations gather this critical information through a series of manual, labor-intensive reporting processes that do not scale. The most sophisticated organizations today are using manually updated spreadsheets to generate reports. These processes are error-prone and the information they produce may already out of date by the time it is reported. This limits a company's ability to ensure efficient storage asset utilization in its current storage infrastructure and to do effective capacity planning for the future. Improving storage utilization is essential to maximizing return on investment (ROI) and achieving an information lifecycle management (ILM) strategy. By understanding how storage is allocated and used, administrators can align resources to information's changing value over time, identify underutilized storage for reclamation, and improve provisioning processes.

Of all the system resources, storage tends to be one of the most difficult to plan capacity for in a predictive fashion. It is only by collecting detailed information about how storage is allocated, and how it is being used that capacity forecasting can be effectively accomplished. Storage administrators today are under increased pressure to keep capital expenditures under control. They must figure out how to both improve the utilization of their existing storage assets and more accurately plan future storage purchases. These objectives, however, cannot be met without a thorough and accurate understanding of the current utilization of their storage infrastructure.

Improving storage utilization from the host perspective is only one part of the equation; unfortunately, many reporting tools on the market today can only provide the host view. Of equal importance is to improve the storage utilization across a storage infrastructure.

Administrators run software (e.g. SRM available from EMC Corporation of Hopkinton, Mass.) that can identify hosts that may be candidates for storage reclamation. These hosts could have large amounts of old, infrequently accessed, duplicate, or non-business files that are consuming valuable storage capacity. Once these hosts are identified, storage administrators can deploy software to locate these files and/or reclaim that capacity by executing action policies.

SUMMARY

Conventional mechanisms such as those explained above suffer from a variety of deficiencies. One such deficiency is that in conventional systems storage for a host may contain several folders, which each folder containing several files. The server crawls through the directories, gathering information regarding the storage. This results in a profile of the use of the storage. Since the server is doing the data collection, the data collection in conventional systems may be server intensive, take lots of processing time, and affect the overall performance of the system.

Embodiments of the invention significantly overcome such deficiencies and provide mechanisms and techniques that provide file and folder scanning. By way of embodiments of the present file and folder scanning technique, a host agent uses a scanning policy from the server, and scans the storage associated with the host system in accordance with the scanning policy. The host system then builds a data summary from the scanning results. The data summary is then provided to the server where it can be used to modify the storage on the host.

In a particular embodiment, a method of performing file and folder scanning at a host includes receiving, at a host, a scanning policy. Storage allocated to the host is scanned. Next, a data summary resulting from data obtained by the scanning is built. The data summary is then forwarded to a system.

Another embodiment involves a system for performing file and folder scanning. In this embodiment a scanning policy is determined at a first system. The scanning policy is forwarded from the first system to a host system. The host system then scans storage allocated to the host and in accordance with the scanning policy. The host then builds a data summary resulting from results of the scanning. The data summary is then forwarded to the first system. The first system uses the data summary to generate a storage profile report. The storage may then be modified as a result of the storage profile report.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides file/folder scanning as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing file/folder scanning as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
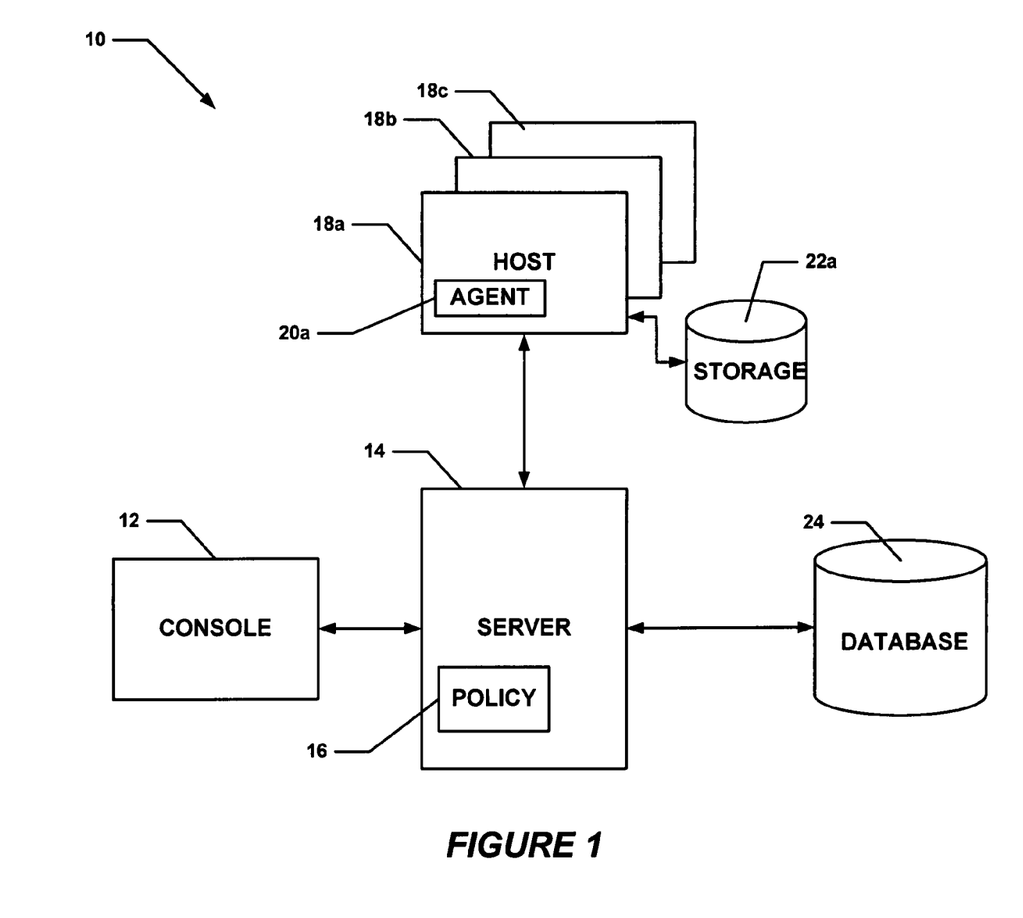
FIG. 1 is a block diagram of a system for performing file and folder scanning.

Referring to FIG. 1, an example system 10 is show, system 10 includes a console 12 in communication with a server 14. Server 14 is in communication with a database 24 and with multiple hosts 18a-18c. Host 18a includes an agent 20a and associated storage 22a.

The console 12 is utilized by a user (e.g., a storage administrator or the like) to produce a scanning policy 16 on server 14. The scanning policy 16 includes rules for identifying certain files which meet defined criteria. The criteria can include, but is not limited to: size (actual and allocated), dates (creation dates, last accessed dates, etc.), file users and file owner information. An example scanning policy is described below.

The server 14, instead of running the scanning policy on storage 22a as is done in conventional systems, provides the policy to host 18a and in particular to agent 20a of host 18a. The same policy may be provided to other hosts (e.g., 18b and 18c) or a different policy could be provided to host 18b and/or host 18c, to be run by respective agents on respect vie storage.

Host 18a receives scanning policy 16 from server 14. Agent 20a on host 18a, uses the policy 16 to perform a scan of storage 22a. In one embodiment, the scan provides two sets of data for each folder scanned. The first set of data is the size total of all files. This includes the file space allocated for a folder as well as the actual file space used for the folder. The first set of data also includes the allocated and actual file space for all folders and subfolders associated with a folder.

The second set of data is known as the "exceptional" data. The exceptional data is the data collected according to the scanning policy. This may include, for example, a file count and file size according to a particular data type (e.g., identify, count and provide a file size for each MP3 file on storage 22a), collect data for files older than a certain date, collect data on files for a particular owner, or other similar type reporting as defined by the storage administrator in the particular policy.

The data results from the scan performed by agent 20a on host 18a are summarized and the summary is provided to server 14. Server 14 uses the data summary (in conjunction with data from database 24) to generate a storage profile report for host 18a (as well as for other storage which has been scanned). The storage 22a may then be modified as a result of the storage profile report.

Figure 2:
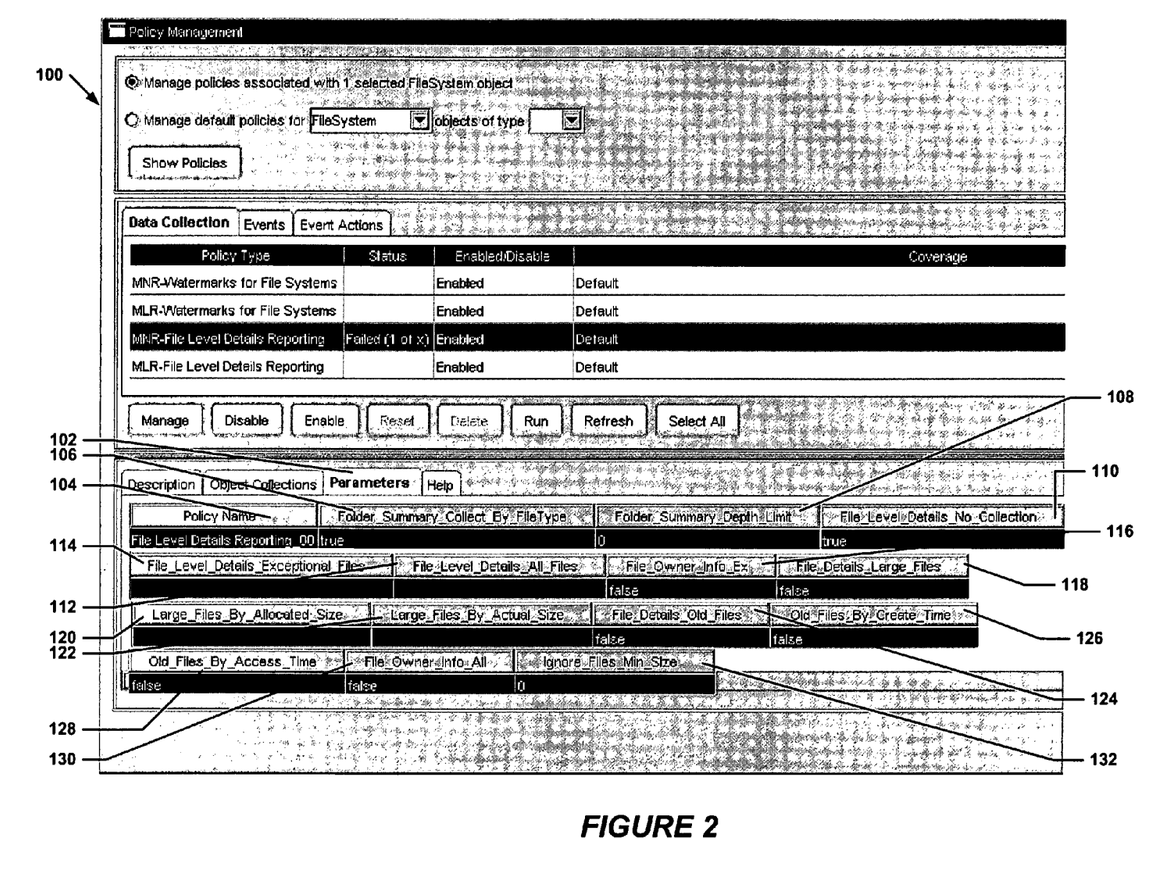
FIG. 2 is an example of a policy defined by a storage administrator to be used for performing file and folder scanning according to embodiments of the invention.

Referring now to FIG. 2, an example screen shot of a particular scanning policy 100 is shown. In this policy the PARAMETERS tab 102 is selected, showing the different parameters the scan will take into account.

Parameter 104 is the policy name. Different policies can be given different names, and can be run on different hosts. Some of the different parameters for this particular policy include: folder summary collected by file type 106. This is used to determine different types of files (e.g. exe files, MP3 files, PDF files) that are resident on the storage. The storage administrator may determine that the storage is being used (at least in part) to store MP3 files, and that these files are personal files and therefore not work related. The policy may decide to temporarily store all MP3 files for two weeks in a temporary storage where they can be reviewed before possible deletion.

Another parameter is the folder summary depth limit 108. In this example, this parameter is set to zero, such that all folders under a directory are scanned. Parameter 110 file_level_details_no_collection is set to true, therefore file details will not be collected during the folder scan. File level details for exceptional files, parameter 112, are used to collect file details for files meeting the exceptional criteria. The exceptional criteria are defined by the storage administrator in the scanning policy. In this example, the exceptional criteria may include identify all MP3 files. Once these files are identified, the storage administrator may take actions regarding these files such as stage, move, copy, delete, compress or the like.

Parameter 114 involves collecting file level details of all files. This is used when it is desirable to collect details for all files. The parameter for file owner information, parameter 116, is set to false in this example, so information regarding this parameter will not be collected or processed. In this example, the storage administrator does not care who the file owner is, Similarly, parameter 118 regarding collecting file details for large files is set to false, therefore no details for large files will be collected. Parameters 120 and 122 regard information about large files either by allocated size or actual size respectively. Parameters 124, 126 and 128 relate to old files and their details, by create time and by access time. These are set to false, so information regarding these parameters will not be collected.

Parameter 130 is file by owner information, which is set to false such that owner information will not be collected and processed. Parameter 132 defines a minimum file size to collect data about. Here it is set to zero such that no files will be ignored.

Figure 3:
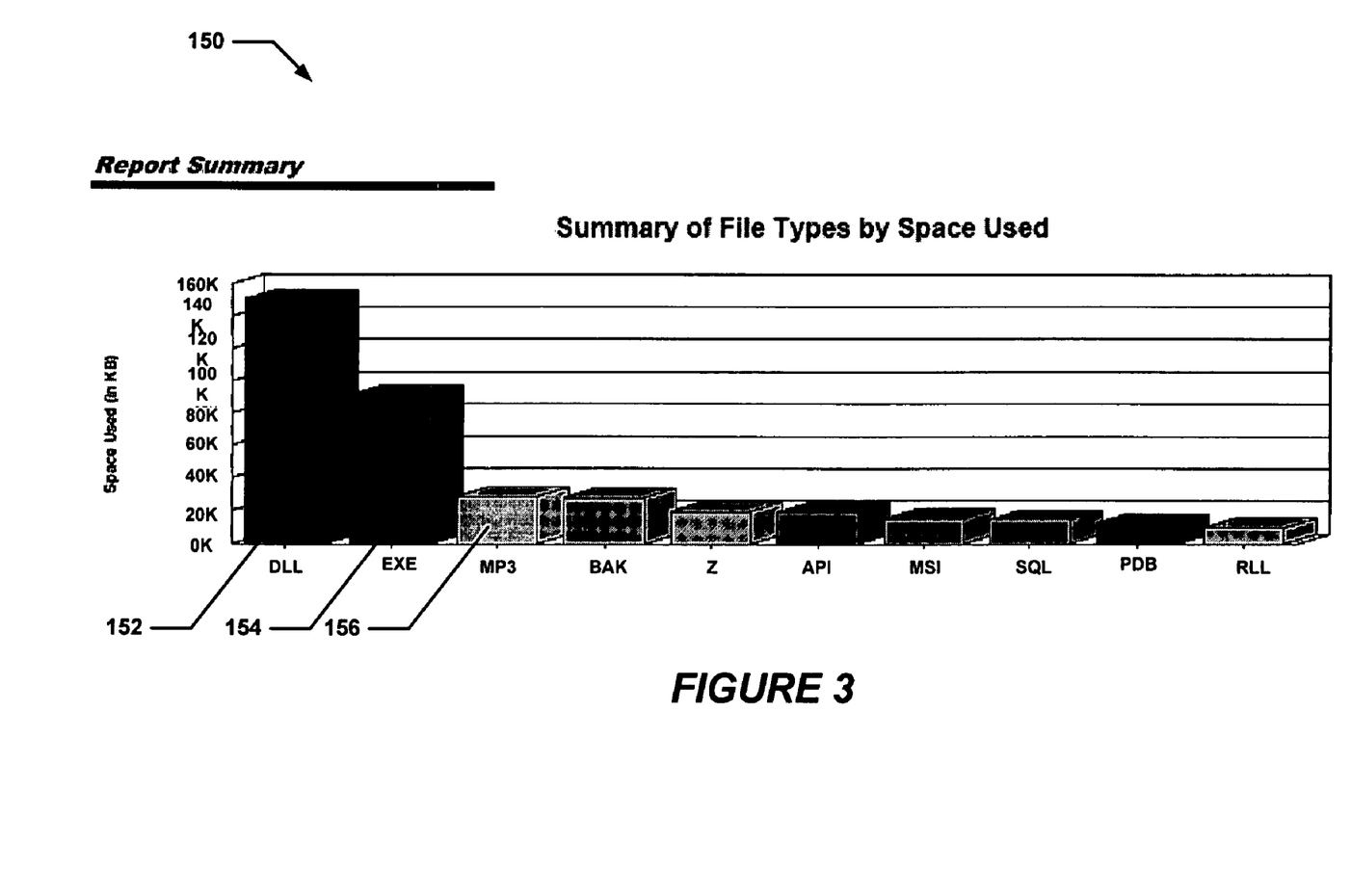
FIG. 3 is an example report summary from a file and folder scanning operation as performed in accordance with the present invention.

Referring now to FIG. 3, an example report summary 150 is shown. While here the report summary is presented as a bar chart, it should be appreciated that any format including but not limited to a graph, a table, a text file or the like could be used. In this example, it was desired to determine the amount, if any, of file space taken up by MP3 files on this particular storage subsystem. Bar 152 shows that approximately 150 MB of storage are taken up by DLL files, which is expected, and bar 154 shows that about 90 Mb of storage are taken up by EXE files, which is also expected. Bar 156 shows that approximately 25 MB of storage are being used by MP3 files, and can probably be recovered.

Figure 4:
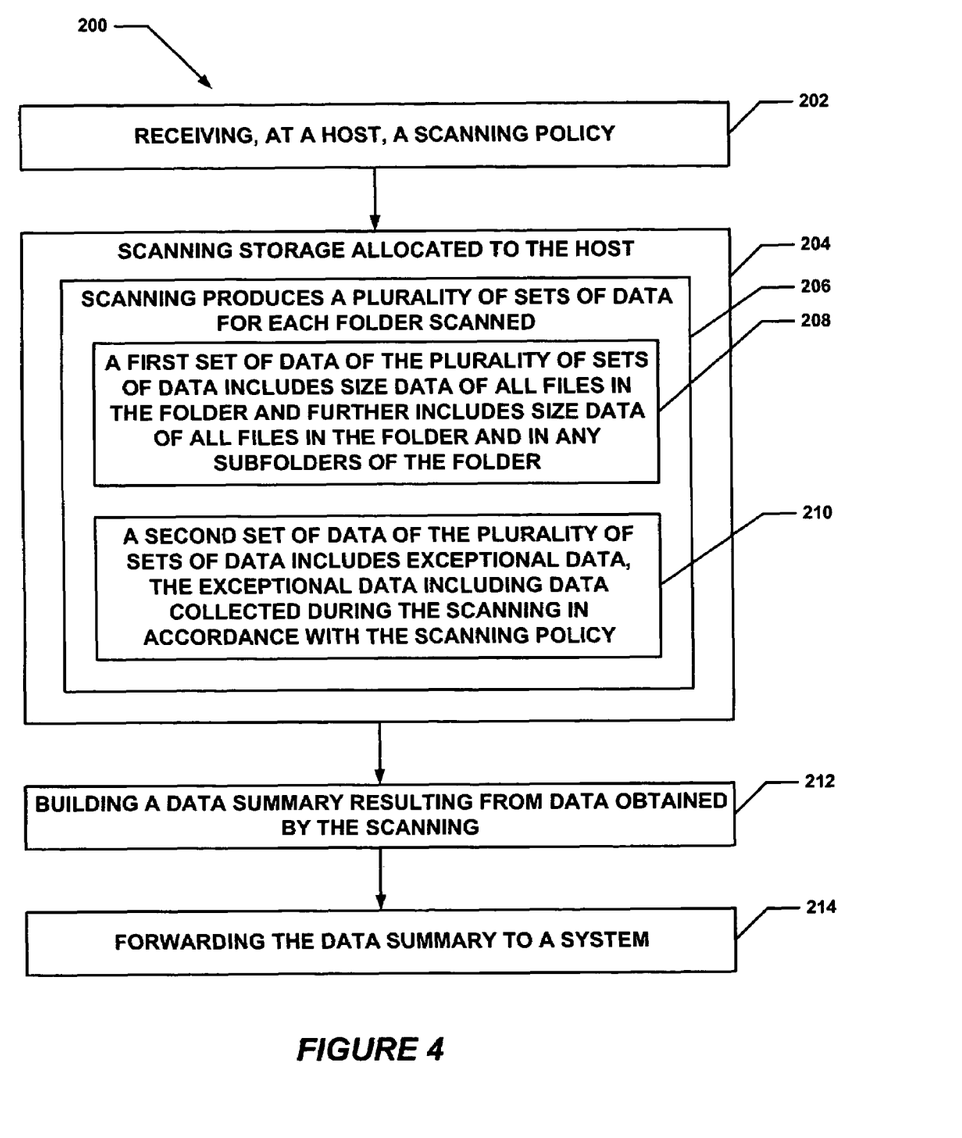
FIG. 4 is a flow diagram of a particular embodiment of a method of performing file and folder scanning on a host.
Figure 5:
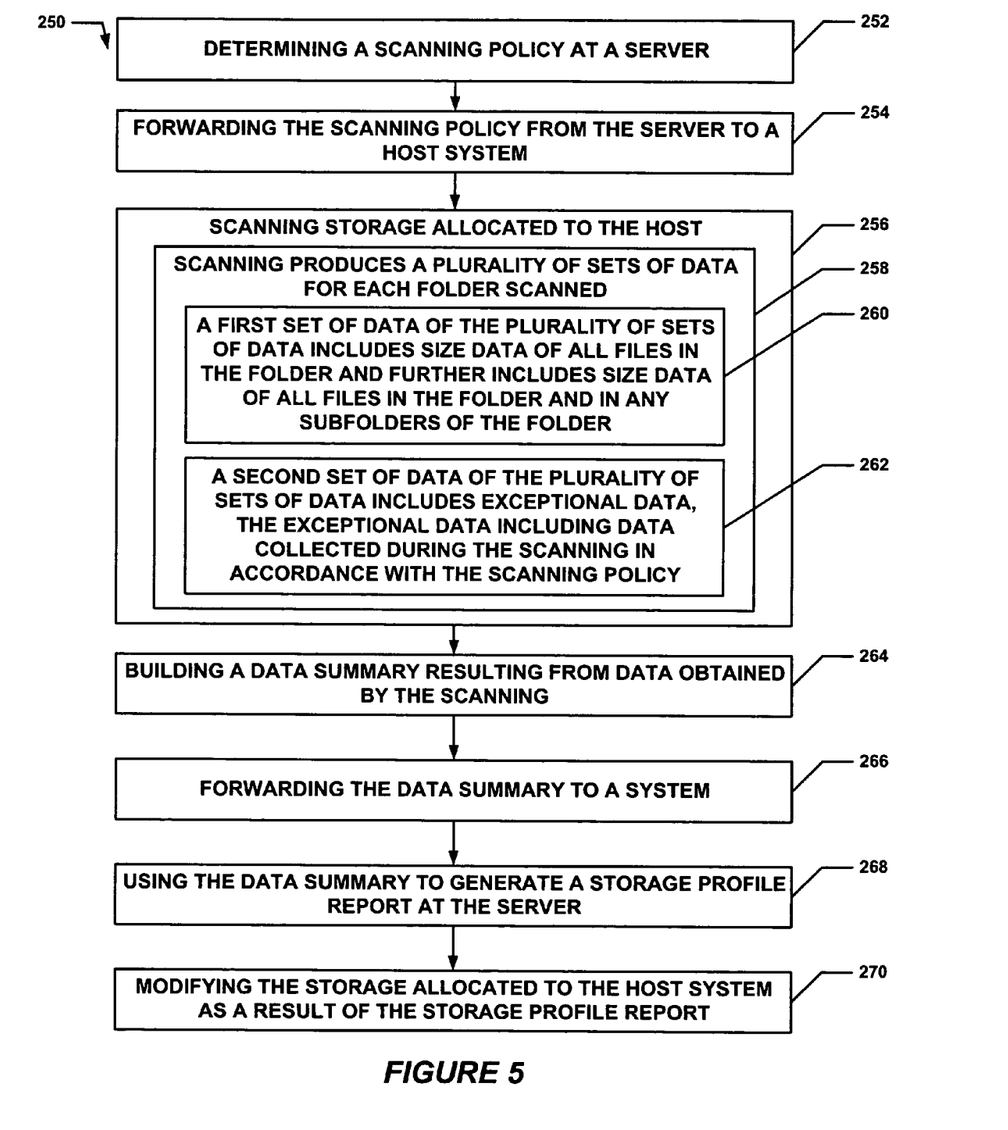
FIG. 5 is a flow diagram of a particular embodiment of a method of performing file and folder scanning in a system.

Flow charts of the presently disclosed methods are depicted in FIGS. 4 and 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 200 of performing file and folder scanning at a host system is shown. The method 200 begins with processing block 202 wherein a scanning policy is received at a host. The scanning policy describes the information being requested as a result of performing the scanning operation.

In processing block 204, the storage allocated to the host is scanned. The agent produces a process which crawls through the directory structure of the storage, gathering data regarding the storage. As recited in processing block 206, the scanning produces a plurality of sets of data for each folder scanned. In processing block 208, the first set of data of the plurality of sets of data includes size data of all files in a folder and further includes size data of all files in the folder and size data of all files in any subfolders of the folder. The size data includes both actual size of storage used for the folder and the allocated space for the folder. In processing block 210 the second set of data of the plurality of sets of data includes exceptional data, the exceptional data including data collected during the scanning in accordance with said scanning policy. Both sets of data are built at the same time.

In processing block 212, a data summary is built, the data summary resulting from data obtained by the scanning. As recited in processing block 214 the data summary is forwarded to a system for further consideration.

Referring now to FIG. 5, a particular embodiment of a method 250 of performing file and folder scanning in a storage system is shown. The method 250 begins with processing block 252 wherein a scanning policy is determined at a server. A user, such as a storage administrator may determine the scanning policy at the server. The scanning policy describes the information being requested as a result of performing the scanning operation.

In processing block 254 the scanning policy is provided from the server to a host system having an agent process. A single policy may be provided for multiple hosts, or individual policies can be provided for respective hosts.

In processing block 256, the storage allocated to the host is scanned. The agent produces a process which crawls through the directory structure of the storage, gathering data regarding the storage. As recited in processing block 2258, the scanning produces a plurality of sets of data for each folder scanned. In processing block 260, the first set of data of the plurality of sets of data includes size data of all files in a folder and further includes size data of all files in the folder and size data of all files in any subfolders of the folder. The size data includes both actual size of storage used for the folder and the allocated space for the folder. In processing block 262 the second set of data of the plurality of sets of data includes exceptional data, the exceptional data including data collected during the scanning in accordance with said scanning policy. Both sets of data are built at the same time.

In processing block 264, a data summary is built, the data summary resulting from data obtained by the scanning. As recited in processing block 265 the data summary is forwarded to a system for further consideration.

In processing block 268 the data summary is used to generate a storage profile report at the server. In processing block 270, storage allocated to the host may be modified as a result of the storage profile report. In such a manner a storage profile is created and is utilized to provide more efficient use of available storage.

Figure 6:
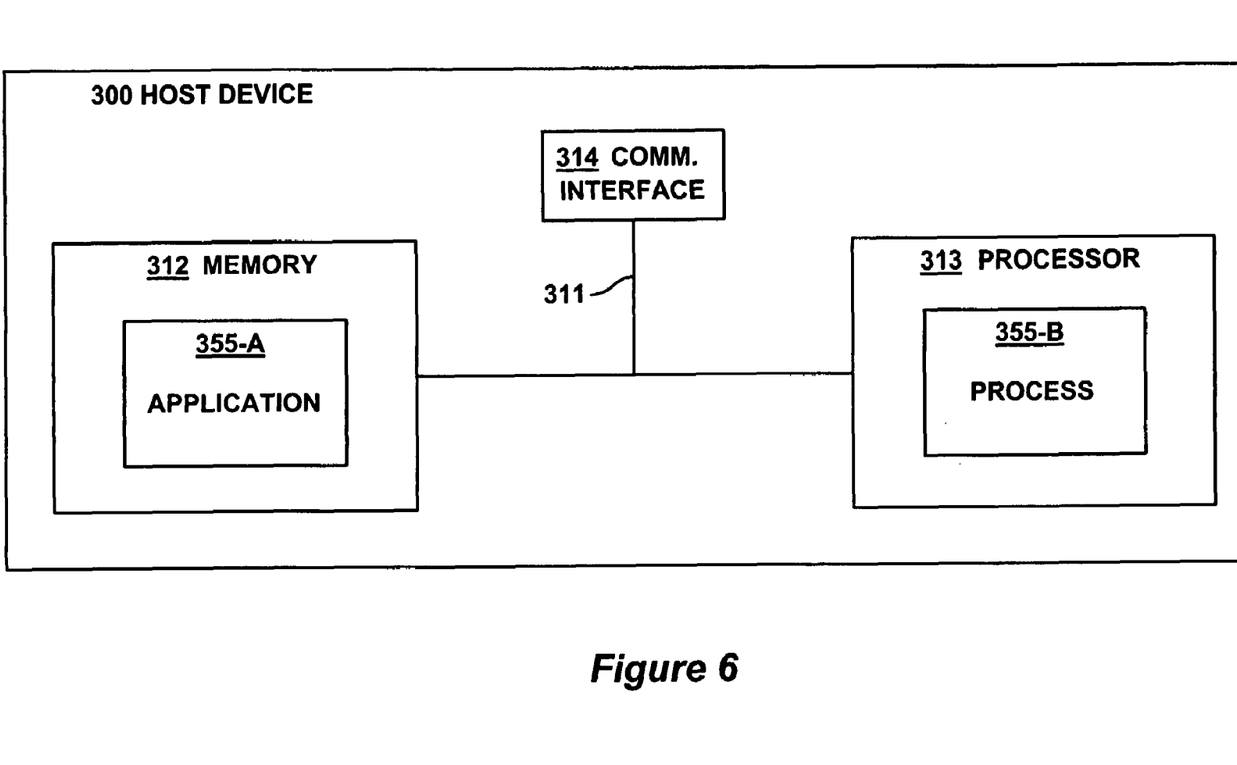
FIG. 6 illustrates an example computer system architecture for a computer system that performs file and folder scanning in accordance with embodiments of the invention.

FIG. 6 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method, implemented in a computerized device, in which at least one computer system accesses instructions from computer storage and executes the instructions comprising:

displaying multiple criterion of a scanning policy, wherein at least one criteria comprises a file type;

sending the scanning policy to a host to be applied to storage allocated to the host;

receiving a data summary generated by the host, the data summary based on data obtained as a result of the host applying the scanning policy to the storage allocated to the host; and rendering at least a portion of the data summary in a report summary, the report summary displaying an indication of file space currently consumed by at least one file having the file type in the storage allocated to the host, wherein the scanning policy includes a first set of rules to:

(i) identify multiple files having the file type located amongst multiple respective folders and sub-folders in the storage allocated to the host;

(ii) collect all the identified multiple files; and (iii) place all the identified multiple files in a temporary storage location to be stored at the temporary storage location for a predetermined amount of time;

wherein displaying multiple criterion of a scanning policy in a graphical user interface includes:

displaying the multiple criterion of the scanning policy in a first section of a graphical user interface upon detecting selection of a selectable tab corresponding to the scanning policy; and in a second section of the graphical user interface, displaying a selectable list of multiple additional scanning policies; and wherein displaying the selectable list of multiple scanning policies includes:

while displaying the multiple criterion of the scanning policy in the first section of the graphical user interface, displaying a failure rate of at least one of the additional scanning policies in the second section of the graphical user interface.

2. The method as in claim 1, wherein displaying the multiple criterion of the scanning policy includes selecting at least one from the group of:

displaying a document type criteria of the scanning policy;

displaying an executable file type criteria of the scanning policy; and displaying an audio file type criteria of the scanning policy.

3. The method as in claim 1, wherein displaying the multiple criterion of the scanning policy includes selecting at least one from the group of:

displaying a file depth criteria of the scanning policy indicating a folder depth in the storage to be scanned by the scanning policy; and displaying a file owner criteria of the scanning policy indicating whether the scanning policy will identify an owner of each file scanned by the scanning policy.

4. The method as in claim 1, wherein displaying the multiple criterion of the scanning policy includes:

displaying a file detail criteria indicating whether the scanning policy will identify details of any file having at least a given size.

5. The method as in claim 1, wherein sending the scanning policy to the host includes:

providing a second set of rules in the scanning policy for the host to identify at least one file located amongst the multiple respective folders and sub-folders having a characteristic matching at least one of the multiple criterion of the scanning policy, the folders and the sub-folders located in the storage allocated to the host.

6. The method as in claim 1, wherein receiving the data summary includes:

receiving a first data set collected by the host according to the scanning policy, the first data set describing characteristics of each scanned folder and each scanned sub-folder; and receiving a second data set collected by the host according to the scanning policy, the second data set describing characteristics of each file identified as matching at least one of the multiple criterion of the scanning policy.

7. The method as in claim 1, wherein rendering the portion of the data summary includes: generating the report summary at a server from which the scanning policy was sent to the host, the host located remotely from the server.

8. A computer program product including a computer-readable medium having instructions stored thereon for processing data information, such that the instructions, when carried out by a processing device, enable the processing device to perform the operations of:

displaying multiple criterion of a scanning policy, wherein at least one criteria comprises a file type;

sending the scanning policy to a host to be applied to storage allocated to the host;

receiving a data summary generated by the host, the data summary based on data obtained as a result of the host applying the scanning policy to the storage allocated to the host; and rendering at least a portion of the data summary in a report summary, the report summary displaying an indication of file space currently consumed by at least one file having the file type in the storage allocated to the host, wherein the scanning policy includes a first set of rules for the host to:

(i) identify multiple files having the file type located amongst multiple respective folders and sub-folders in the storage allocated to the host;

(ii) collect all the identified multiple files; and (iii) place all the identified multiple files in a temporary storage location to be stored at the temporary storage location for a predetermined amount of time;

wherein displaying multiple criterion of a scanning policy in a graphical user interface includes:

displaying the multiple criterion of the scanning policy in a first section of a graphical user interface upon detecting selection of a selectable tab corresponding to the scanning policy; and in a second section of the graphical user interface, displaying a selectable list of multiple additional scanning policies; and wherein displaying the selectable list of multiple scanning policies includes:

while displaying the multiple criterion of the scanning policy in the first section of the graphical user interface, displaying a failure rate of at least one of the additional scanning policies in the second section of the graphical user interface.

9. The computer program product as in claim 8, wherein displaying the multiple criterion of the scanning policy includes selecting one from the group of:

displaying a use file type criteria of the scanning policy indicating the scanning policy scans files used for at least one of: a personal use and a work use.

10. The computer program product as in claim 8, wherein displaying the multiple criterion of the scanning policy includes selecting at least one from the group of:

displaying a document type criteria of the scanning policy;

displaying an executable file type criteria of the scanning policy; and displaying an audio file type criteria of the scanning policy.

11. The computer program product as in claim 8, wherein displaying the multiple criterion of the scanning policy includes selecting at least one from the group of:

displaying a file depth criteria of the scanning policy indicating a folder depth in the storage to be scanned by the scanning policy; and displaying a file owner criteria of the scanning policy indicating whether the scanning policy will identify an owner of each file scanned by the scanning policy.

12. The computer program product as in claim 8, wherein displaying the multiple criterion of the scanning policy includes:

displaying a file detail criteria indicating whether the scanning policy will identify details of any file having at least a given size.

13. The computer program product as in claim 8, wherein sending the scanning policy to the host includes:

providing a second set of rules in the scanning policy for the host to identify at least one file located amongst the multiple respective folders and sub-folders having a characteristic matching at least one of the multiple criterion of the scanning policy, the folders and the sub-folders located in the storage allocated to the host.

14. The computer program product as in claim 8, wherein receiving the data summary includes:

receiving a first data set collected by the host according to the scanning policy, the first data set describing characteristics of each scanned folder and each scanned sub-folder; and receiving a second data set collected by the host according to the scanning policy, the second data set describing characteristics of each file identified as matching at least one of the multiple criterion of the scanning policy.

15. The computer program product as in claim 8, wherein rendering the portion of the data summary includes: generating the report summary at a server from which the scanning policy was sent to the host, the host located remotely from the server.

16. A computer system comprising:

a processor;

a memory unit that stores instructions associated with an application executed by the processor; and an interconnect coupling the processor and the memory unit, enabling the computer system to execute the application and perform operations of:

displaying multiple criterion of a scanning policy, wherein at least one criteria comprises a file type;

sending the scanning policy to a host to be applied to storage allocated to the host;

receiving a data summary generated by the host, the data summary based on data obtained as a result of the host applying the scanning policy to the storage allocated to the host; and rendering at least a portion of the data summary in a report summary, the report summary displaying an indication of file space currently consumed by at least one file having the file type in the storage allocated to the host, wherein the scanning policy includes a first set of rules for the host to:

(i) identify multiple files having the file type located amongst multiple respective folders and sub-folders in the storage allocated to the host;

(ii) collect all the identified multiple files; and (iii) place all the identified multiple files in a temporary storage location to be stored at the temporary storage location for a predetermined amount of time;

wherein displaying multiple criterion of a scanning policy in a graphical user interface includes:

displaying the multiple criterion of the scanning policy in a first section of a graphical user interface upon detecting selection of a selectable tab corresponding to the scanning policy; and in a second section of the graphical user interface, displaying a selectable list of multiple additional scanning policies; and wherein displaying the selectable list of multiple scanning policies includes:

while displaying the multiple criterion of the scanning policy in the first section of the graphical user interface, displaying a failure rate of at least one of the additional scanning policies in the second section of the graphical user interface.

* * * * *